XR 3,923,486

United S
Kitano et al.

[11] 3,923,486
[45] Dec. 2, 1975

[54] METHOD OF PRODUCING LIGHT-CONDUCTING GLASS STRUCTURE

[75] Inventors: Ichiro Kitano, Kobe; Ken Koizumi, Itami; Hiroyoshi Matsumura, Osaka, all of Japan

[73] Assignee: Nihon Itagarasu Kabushiki Kaisha, Japan

[22] Filed: Sept. 19, 1973

[21] Appl. No.: 398,832

Related U.S. Application Data

[60] Division of Ser. No. 147,256, May 26, 1971, which is a continuation of Ser. No. 806,368, March 12, 1969, abandoned.

[52] U.S. Cl. ........ 65/30 E; 65/DIG. 7; 350/96 WG; 350/175 GN
[51] Int. Cl.² ...................... C03C 15/00; G02B 5/14
[58] Field of Search ............. 65/4, 30, DIG. 7, 30 E; 350/96 WG, 175 GN

[56] References Cited
UNITED STATES PATENTS

| | | | |
|---|---|---|---|
| 3,320,114 | 5/1967 | Schulz | 65/30 X |
| 3,434,774 | 3/1969 | Miller | 350/96 WG |
| 3,486,808 | 12/1969 | Hamblen | 350/175 GN |
| 3,563,057 | 2/1971 | Rosenbauer | 65/30 |

OTHER PUBLICATIONS

Miller, Article in Bell System Technical Journal, Vol. 44, No. 9, Nov. 1965, pp. 2017–2030.

*Primary Examiner*—Robert L. Lindsay, Jr.
*Attorney, Agent, or Firm*—Robert E. Burns; Emmanuel J. Lobato; Bruce L. Adams

[57] ABSTRACT

By heat treating a glass member containing at least one kind of cation to constitute a modifying oxide in contact with a source of another kind of cation to cause ion substitution, a light-conducting glass structure can be produced to have a refractive index distribution wherein the index varies progressively transversely to the intended light path, which is thereby bent toward the direction of increase of the index, such a light-conducting glass structure is not accompanied by differences or lagging of phase velocities of conducted light rays, spreading of the light flux width, and reflection losses.

10 Claims, 22 Drawing Figures

METHOD OF PRODUCING LIGHT-CONDUCTING GLASS STRUCTURE

This is a division, of application Ser. No. 147,256, filed May 26, 1971 which is a continuation of application Ser. No. 806,368 filed Mar. 12, 1969, now abandoned.

BACKGROUND OF THE INVENTION

This invention relates to light-conducting glass structures having a refractive index gradient in a direction transverse to the direction in which light propagates therethrough and more particularly to a method for producing these light-conducting glass structures.

A light-conducting fibre of known type consists essentially of a core structure of a light-conducting substance of relatively high refractive index and a cladding layer of a light-conducting substance of relatively low refractive index covering the core structure. A flux of light incident on one end of the fibre is propagated therealong by being repeatedly reflected from the interface between the core structure and the cladding layer as described hereinafter and illustrated in FIG. 1 of the accompanying drawings.

However, a clad-type light-conducting fibre of this known character in which reflection is utilized is accompanied by the following problems. First, as the light flux, the amplitude of which is varying at a very high speed, and which has entered the fibre, advances by undergoing repeated total reflection, differences in the light path lengths of the individual light rays of the light flux occur, and, consequently, staggering or differences in phase are produced when the light flux exits from the fibre. When such differences in the light flux phase are existent, it is difficult to utilize the light-conducting fibre as a path for transmitting in a communication system, in which light signals varying at ultra high speed are employed.

Furthermore, as the incident light flux advances as it is reflected by curved interface surfaces within the fibre, the width of the light flux unavoidably and progressively increases, and, at the same time, there arise reflection losses at the aforementioned interface. These phenomena are also causes of lowering of the efficiency of photocommunication and other light-transmitting systems.

A light-conducting glass fibre in which the refractive index increases progressively from the surface toward the interior has already been proposed. The utilization of a glass in which the refractive index decreases in proportion to the square of the distance from the centreline for a light-conducting path or a part thereof has been proposed in order to overcome the above defects. ( Proceedings of the IEEE, Vol. 53, P. 2148–2149, December, 1965, and Uchida Teiji: Denshi Tsushin Gakkai Soritsu 50-Shū-Nen Kinen Zenkoku Taikai Symposium, Yokō-Shū "Laser Ōyō" — Hen, p. 3–4, October, 1967 (translation: (Japan) Society of Electronic Communication (Engineers) Fiftieth Anniversary National Convention Symposium Preprint "Laser Application" edition, p. 3–4, October, 1967) ).

However, light-conducting glass structures or light-conducting glass fibres having such refractive index distributions could not be realized on a commercial scale because methods of producing such structures have heretofore been unknown.

Furthermore, so-called "gas lenses" have heretofore been known. For example, on pages 465, 466, and 467 of The Bell System Technical Journal, March Issue, 1965, it is disclosed that glass structures and other transparent structures having refractive index distributions which decrease or increase as the square of the distance from their centre lines exhibit a lens effect. However, structures which are transparent lens structures having such a refractive index distribution and, moreover, are practical have not heretofore been realized.

We have discovered that a glass structure having a progressively varying refractive index can be produced by causing the concentration of certain ingredients of the glass to vary with position as described fully hereinafter.

SUMMARY OF THE INVENTION

Accordingly, it is an object of the present invention to utilize this finding and other findings to provide light-conducting glass structures each having a refractive index gradient in a direction transverse to the direction in which light is to advance.

Another object of the invention is to provide a light-conducting glass fibre or glass rod in which differences in phases of a light flux, which vary at ultra high speed, at the outlet end, spreading of the light flux width, and reflection losses are prevented, and which thereby can be utilized effectively for photocommunication.

Still another object of the invention is to provide a method for producing light-conducting glass structures of the above stated character.

A further object of the invention is to provide a method for producing light-conducting glass structures of the above stated character which is not accompanied by difficulties such as the formation of cracks on the surface of the product.

Other objects of the invention will presently become apparent from the following description.

The foregoing objects have been achieved by the present invention, in one aspect of which there is provided a light-conducting glass structure in which the refractive index of the glass varies with position by causing the concentration distributions of at least two cations constituting modifying oxides within the glass to vary with position.

Such a light-conducting glass structure according to the invention can be produced by a method also of the invention in which the cation concentration distributions are varied by a process comprising ion substitution due to heat diffusion.

According to the present invention in one aspect thereof, briefly summarized, there is provided a light-conducting glass structure containing the least two kinds of cations constituting modifying oxides within the glass and having therewithin a distribution of refractive index such that the index varies with position in a direction transverse to the direction of light conduction, which is thereby bent toward the direction of increase of the index. This glass structure comprises glass forming oxides and modifying oxides, and the concentration of the cations within the glass varies in the direction in which the refractive index is to vary, the concentrations of some cations and those of other cations varying in opposite directions thereby to create refractive index variation.

According to the present invention in another aspect thereof, there is provided a method for producing light-conducting glass structures of the above stated character which method is characterised by the process of placing a glass material containing the aforementioned cations in contact with a source of other cations capable of constituting modifying oxides and heat treating the glass material and cation source at a temperature permitting the cations to migrate within the glass thereby to cause at least one kind of cation located in positions nearer to the glass surface to be substituted to a greater degree by the other cation.

The nature, principles, details, and utility of the invention will be more clearly apparent from the following detailed description, beginning with general considerations and concluding with specific examples of preferred embodiment of the invention, when read in conjunction with the accompanying drawings.

DETAILED DESCRIPTION

Figure 1:
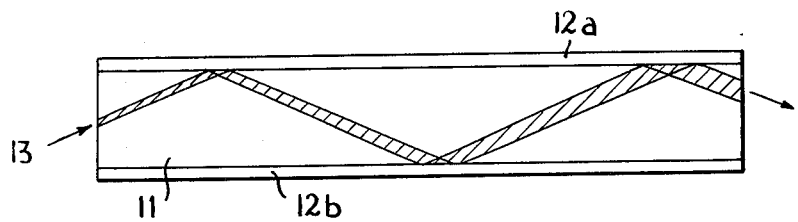
FIG. 1 is an enlarged side view, in longitudinal section (taken along a plane parallel to the light path), indicating schematically the principle of the light propagation through and within a light-conducting glass structure known heretofore.

As conductive to a full understanding of the present invention, a brief consideration of the aforementioned light-conducting fibre of heretofore known type will be first presented with reference to FIG. 1.

As shown in FIG. 1, this fibre consists essentially of a core structure 11 of a light-transmitting substance of relatively high refractive index and cladding layers 12a and 12b of a light-transmitting substance of relatively low refractive index, interfaces being formed between the core structure and the cladding layers. In the operational use of this fibre, an incident light flux 13 is caused to enter one end of the core structure so as to advance with an angle greater than the reflection critical angle of this interfaces and is thereby reflected repeatedly by the interfaces to be propagated through and along the fibre core structure 11. A clad type light-conducting fibre of this character, however, is accompanied by various difficulties as described hereinbefore.

In general, in a light-conducting glass structure in which the refractive index is progressively varied in a direction transverse to that along which incident light is to advance, utilization is made of the principle whereby the light gradually bends its advance direction toward the direction in which the refractive index transverse to the light advance direction increases.

The radius of curvature, $\rho$, of the light advance path may be represented analytically by the following well-known equation in terms of the refractive index $\eta$ of the transmitting medium and variation $\delta\eta/\delta H$ of the refractive index in a direction normal to the light advance path.

$$\frac{1}{\rho} = \frac{1}{\eta} \frac{\delta\eta}{\delta H} \qquad (1)$$

Accordingly, this light-conducting glass structure in one embodiment has a refractive index gradient such that the refractive index at the central plane or central axis in the direction of light advance is maintained at maximum value, and the refractive index progressively decreases with increasing distance away from the central plane or axis. At the same time, in the case wherein the length along the central plane of axis of this structure is relatively large, light which has entered the glass structure with an incident angle within a specific range advances along the structure in a meandering or undulating path about the central plane or axis.

Figure 2:
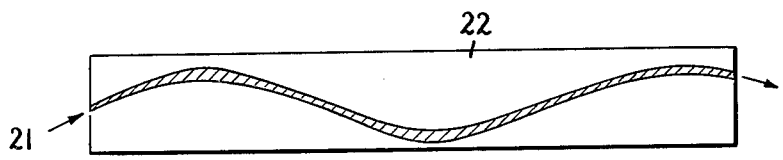
FIG. 2 is a view similar to FIG. 1 indicating schematically the principle of light propagation through and within one example of a light-conducting glass structure according to the invention.

When an incident light flux 21 is caused to enter one end of a light-conducting glass fibre 22 having a refractive index distribution such that this index decreases progressively toward the outer surface from the centre, this light flux advances through the interior of the fibre without being reflected by the fibre outer surface as diagrammatically illustrated in FIG. 2. Therefore, it is possible to reduce differences in phase velocities of the light flux at the fibre exit end, spreading of the light flux, and also reduce light reflection losses.

It is preferable that the refractive index be symmetrical about the central part of the fibre in the cross section thereof and moreover, have a distribution such that it decreases progressively from the centre to the outer surface since, then, the differences in phase velocities of the light flux at the fibre exit and the light flux spread can be further reduced.

The most preferable refractive index distribution is such that it can be represented by a quadratic curve of a form corresponding to the following equation.

$$N = N_0 (1 - ar^2), \quad (2)$$

where:
r is the distance from the fibre centre in a radial direction;
$N_0$ is the refractive index of the glass at the central part of the fibre;
N is the glass refractive index at a point at distance r; and
a is a positive constant.

When an incident light flux having a constant spacial width and a constant time width is introduced with an incident angle within a specific range into a glass fibre having a refractive index distribution as defined above, the light flux intimately exits from the fibre exit in a state wherein, its time width is maintained substantially constant and its spacial width is maintained constant without differences in phase.

When this light-conducting glass fibre is curved with a curvature radius less than a certain limiting value of the radius of curvature, the incident light flux begins to collide against the fibre surface. This limiting radius of curvature is determined by the refractive index distribution within the fibre. More specifically, this radius of curvature decreases as the refractive index gradient, that is, the value of "a" in the above Equation (2), is increased.

The refractive index of a glass depends principally on the glass composition. Accordingly, a glass structure in which the refractive index of the glass interior progressively varies can be produced by causing it to have a progressively differing glass composition distribution. Furthermore, a light-conducting glass fibre in which the refractive index progressively increases from the surface inward can be produced by causing it to have a glass composition distribution differing progressively inward from the surface.

However, glass structures, particularly glass fibres, having glass composition distributions such the their refractive indexes vary progressively have, in general, been accompanied by difficulties such as the difficulty in selection of the compositions and difficulty in the production thereof.

In general, an oxide glass is composed of one or more glassforming oxides (e.g., $SiO_2$, $B_2O_3$, and $P_2O_5$) and other modifying oxides (including intermediate oxides). The term "modifying oxides" is herein used to designate oxides which, independently, do not become glass but are vitrified when they are suitably blended with glass-forming oxides.

As mentioned briefly hereinbefore, we have found that, by causing the concentrations of at least two of the oxides among the modifying oxides within a glass to vary with position, it is possible to produce a glass structure having a glass composition distribution such that the refractive index progressively varies therein.

More specifically, we have found that a glass composition distribution wherein the proportions of at least two oxides selected from among oxides which can function as modifying oxides are progressively varied is highly suitable, Examples of such oxides are $Li_2O$, $Na_2O$, $K_2O$, $Rb_2O$, $Cs_2O$, $Tl_2O$, $Au_2O$, $Ag_2O$, $Cu_2O$, MgO, CaO, SrO, BaO, ZnO, CdO, PbO, $SnO_2$, and $La_2O_3$.

In general, the refractive index of a substance has a relationship to the molecular refraction and molecular volume which are characteristic of that substance, the refractive index increasing with increasing molecular refraction and with decreasing molecular volume. Furthermore, the molecular refraction is proportional to the polarizability of the substance. The molecular refraction of a glass is considered to be determinable, as an approximation, by the sum of the individual ionic refractions.

Accordingly, the qualitative effect of the presence of certain ions on the refractive index of a glass can be determined by comparing the values of electronic polarization per unit volume within the glass of the related ions or the values of electronic polarizability/(ion radius)$^3$ That is, a cation in which this value is large has a tendency to contribute greatly to the refraction. When the values of this ratio of electronic polarisabity to (ion radius)$^3$ within the crystal are calculated for the monovalent ions respectively of lithium, sodium, potassium, rubidium, cesium, and thallium as representative cations constituting modifying oxides, 0.06, 0.48, 0.57, 0.60, 0.74, and 1.57, respectively, are obtained.

However, the values of this ratio within glasses of certain ions do not coincide, strictly speaking, with those within the crystals of these ions. For example, the refractive indexes of silicate two-compoent glasses each containing 30 mol percent of an oxide of one of the above mentioned monovalent ions and three-component glasses containing 20 mol percent of one of the monovalent atoms, 20 mol percent of CaO, and 60 mol percent of $SiO_2$ are as set forth in Table 1.

Table 1.

| Modifying oxide | Refractive index | |
|---|---|---|
| | $SiO_2$ 70 mol% <br> $R_2O$ 30 mol% | $SiO_2$ 60 mol% <br> CaO 20 mol% <br> $R_2O$ 20 mol% |
| $Li_2O$ | 1.53 | 1.57 |
| $Na_2O$ | 1.50 | 1.55 |
| $K_2O$ | 1.51 | 1.55 |
| $Rb_2O$ | 1.50 | 1.54 |
| $Cs_2O$ | 1.50 | 1.54 |
| $Tl_2O$ | 1.83 | 1.80 |

When the monovalent ions respectively of lithium, sodium, potassium, rubidium, cesium, and thallium as indicated in Table 1 are arranged in the order of magnitude of the ratio of electronic prolarisability to (ion radius)$^3$ within glass or in the order of degree of contribution to increase in refractive index, the resulting order is Tl, Li, K, Ma, Rb, and Cs, there being almost no difference between K, Na, Rb, and Cs.

Furthermore, the refractive indexes of silicate two-component Glasses each containing 40 mol percent of one oxide selected from PbO, BaO, CdO, SrO, CaO, ZnO, BeO, and MgO and 60 mol percent of $SiO_2$ are as set forth in Table 2.

Table 2.

| Modifying oxide | Refractive index |
|---|---|
| | $SiO_2$ 60 mol% <br> RO 40 mol% |
| PbO | 1.81 |
| BaO | 1.68 |
| CdO | 1.64 |
| SrO | 1.61 |

Table 2.-continued

| Modifying oxide | Refractive index SiO₂ 60 mol% RO 40 mol% |
|---|---|
| CaO | 1.59 |
| ZnO | 1.58 |
| BeO | 1.54 |
| MgO | 1.51 |

As indicated by Table 2, when these divalent metal ions are arranged in the order of magnitude of contribution to increase in the glass refractive index, the resulting order is Pb, Ba, Cd, Sr, Ca, Zn, Be, and Mg.

The relationship between the magnitudes of the above mentioned contribution of the monovalent ions and the divalent ions can be determined by comparing the refractive indexes of glasses of compositions wherein a monovalent oxide and a divalent oxide have been mutually substituted in equal mol quantities, for example, by comparing the refractive index of a glass composed of 60 percent of SiO₂ and 40 percent of a divalent metal oxide RO and the refractive index of a glass composed of 60 percent of SiO₂, 20 percent of a divalent metal oxide RO, and 20 percent of a monovalent metal oxide R₂O, all percentages being mol percents.

As a result of an actual instance of such comparison, it was found that the above mentioned degrees of contribution of the divalent ions of Pb, Ba, Cd, Sr, Ca, and Zn are greater than those of the monovalent ions of K, Na, and Li, and that this degree of contribution of the monovalent ion of Tl is greater than that of any divalent metal ion.

The relationships of the magnitudes of this degree of contribution to increase in refractive index of these cations are also realized in the glass compositions other than those recited in Table 1 and 2. Accordingly, since the additivity rule of refractive indexes is approximately realized the relationships of the magnitudes of the degree of contribution become evident as the magnitudes of the refractive index of a glass containing these cations even in the case of a composition other than silicate glass, and even when the component contents differ, as long as glasses wherein the mol concentrations of the oxides of the cations concerned are mutually equal and, moreover, other constituents are of the same kind and have mutually equal mol concentrations, are compared.

As a general tendency, among ions of homologues (for example, among ions of alkaline earths), those of greater ionic radius and atomic number have greater degrees of contribution to increase in the refractive index. For example, $Ba^{++} > Sr^{++} > Ca^{++}$.

Accordingly, when the refractive index of a first glass containing certain cations constituting modifying oxides is compared with the refractive index of a second glass in a state wherein one part or all of the cations within the first glass are substituted in a manner such that the charges of ions are balanced with cations having lower degrees of contribution to increase in refractive index within the glass than the cations of the first glass, the latter is less than the former.

Accordingly, the light-conducting glass structure according to the present invention contains therein at least two kinds of cations constituting modifying oxides and comprises these oxides and glass forming oxides, within which glass the refractive index has a distribution such that it varies progressively with position, more specifically, such that it varies progressively in a direction transverse to the direction of advance of light propagating through the glass, the direction of light advance being bent toward the direction in which the refractive index increases.

In this glass structure of the invention, in general, the concentrations within the glass of the cations vary in the direction in which the refractive index is to vary, and the concentration of certain cations and the concentration of other cations vary in opposite orientations, the resulting concentration variation thereby creating the variation in refractive index.

In accordance with the present invention, the above used term "at least two kinds of cations" designates a combination of metal ions of greater contribution to increase in the refractive index of the above mentioned glass structure and metal ions of less contribution. The concentration of the metal ions of greater contribution is higher in a position at which the refractive index is to be higher than in a position at which the refractive index is to be lower, while the concentration of the metal ions of less contribution is lower in a position at which the refractive index is to be higher than in a position at which the refractive index is to be lower.

Since the cations constituting the modifying oxides can undergo migration within the glass at a relatively lower temperature than the cations constituting the glass forming oxides, the light-conducting glass structure of the invention, in which the concentration within the glass of the cations constituting modifying oxides is varied, can be readily caused to have a desired refractive index distribution. Ordinarily, within this light-conducting glass structure, the concentration of the cations constituting the glass forming oxides does not vary remarkably with position or is substantially constant.

The refractive index of the light-conducting glass structure of the invention varies progressively, as described above, and the refractive index distribution within a light-conducting glass fibre, which is a specific example of embodiment of the invention, is such that the refractive index increases from the outer surface of the fibre toward the interior. In this case, while a continuous variation or increase in the refractive index is preferable, there is no deleterious result even with a discontinuous variation or increase of the refractive index provided that it is of an order such that the reflection of light at the discontinuous surface can be neglected.

Examples of cations to constitute the above mentioned modifying oxides are monovalent cations, for example, alkali metal ions such as $Li^+$ ions, $Na^+$ ions, $K^+$ ions, $Rb^+$ ions, and $Cs^+$ ions, $Tl^+$ ions, $Au^+$ ions, $Ag^+$ ions, and $Cu^+$ ions; divalent cations, for example, alkaline earth metal ions such as $Mg^{+2}$ ions, $Ca^{+2}$ ions, $Sr^{+2}$ ions, and $Ba^{+2}$ ions, $Zn^{+2}$ ions, $Cd^{+2}$ ions, and $Pb^{+2}$ ions; trivalent cations, for example, $La^{+3}$ ions and $In^{+3}$ ions; and tetravalent cations, for example, $Sn^{+4}$ ions and $Th^{+4}$ ions.

Examples of combinations of metal ions for forming at least two modifying oxides with metal ions of greater contribution and metal ions of less contribution to increase in the refractive index selected from a group of specific metal ions as enumerated above are as follows. In each of these combinations, the first mentioned ion is a metal ion to exist with a higher concentration in a position at which the refractive index is to be higher than in a position at which the refractive index is to be lower.
1. Thallium — at least one kind of alkali metal ion.
2. Alkaline earth metal ion having a greater atomic number — alkaline earth metal ion having a smaller atomic number.
3. Lead ion — at least one kind of alkaline earth metal ion.
4. At least one kind of ion selected from the group consisting of lead ion and barium ion — at least one kind of ion selected from the group consisting of K, Na, and Li.
5. At least one kind of ion selected from the group consisting of lead, cadmium, zinc, barium, strontium, and calcium — at least one kind of alkali metal ion.

Among the cations constituting modifying oxides, monovalent ions can be diffuse through glass at a lower temperature than other cations. Therefore, by selecting monovalent cations for both of the two kinds of cations of increasing and decreasing concentrations within the glass, greater convenience is afforded in the production of glass structures including fibres. Furthermore, a combination of $Tl^+$ ions among monovalent cations and at least one kind of ion of another alkali metal as, for example, $Na^+$, $Li^+$, $K^+$, $Rb^+$, and $Cs^+$ ions facilitates the attainment of large refractive index variations and is, therefore, most convenient for the light-conducting structure itself and also for the method for production thereof as described in detail hereinafter.

The cations constituting the modifying oxides contained within the glass of the invention is not limited in number to two kinds but may be of three or more kinds. For example, a glass fibre in which, when three kinds of cations of different values of the aforementioned ratio which can constitute modifying oxides are selected and arranged as A ion, B ion, and C ion in the order of magnitude of the aforementioned ratio, the concentration within the glass of the B ion decreases inward from the surface, while those of the A ion and C ion both increase inward from the surface can have a refractive index distribution such that the index progressively increases inward from the surface.

That is, in the case wherein the difference between the aforementioned ratios of the C ion and B ion is considerably less than the difference between the ratios of the B ion and A ion, or in the case wherein the variation of the concentration of the C ion is less than that of the A ion or the B ion, the presence of the A ion and B ion counteracts the effect of the C ion. As a result, the distribution of the refractive index becomes such that the index increases progressively inward from the surface. Furthermore, cations constituting other modifying oxides may be contained without concentration variation within the glass.

Thus, a variation in the refractive index is created in the glass structure of the invention by the variation with position of the concentrations of at least two kinds of cations constituting modifying oxides within the glass. This variation in the refractive index is of a magnitude sufficient to provide a light-conducting glass structure which does not have the disadvantageous features observable in light-conducting structures of known clad type.

More specifically, for example, the difference between the refractive indexes at the core and surface of a glass structure or fibre in accordance with the invention having a diameter of less than 5 mm., for example, from 0.02 to 2 mm., in general, is at least 0.003 for example, from 0.01 to 0.3. Furthermore, in a light-conducting glass structure having a relatively large diameter (dimension in the direction transverse to the direction of light advance) desirably afforded by a "clad type" light-conducting glass structure, the difference between the refractive indexes at the core and at the surface is of the order of from 0.03 to 0.3 in the case of a diameter of from 1 to 5 mm.

Glasses suitable for use in the light-conducting glass structure of the invention are silicate glasses, borate glasses, phosphate glasses, and other oxide glasses. The desirable ranges of the glass compositional quantities are determined by various factors as, for example, the kinds of modifying oxides, the refractive index distribution to be created, the kinds of oxides to form the glass, the characteristics as a glass material required of the this light-conducting glass structure, and the method of manufacture.

More specifically, for example, it is not desirable that the quantity of $Tl_2O$ preferably used in the glass of the invention exceed 50 percent by weight. The reason for this is that, when the $Tl_2O$ quantity exceeds 50 weight percent, an undesirable colouration can readily occur in the glass. On the other hand, moreover, it is preferable that the $Tl_2O$ quantity be greater than 2 percent by weight at the region where the refractive index is maximum. The reason for this is that, when this quantity is less than 2 weight percent, a concentration variation for producing an amply large variation in the refractive index cannot be attained.

Accordingly, one example of the glass structure of the invention contains from 2 to 40 percent by weight of $Tl_2O$ at the region where the refractive index is maximum, from 35 to 75 percent by weight of $SiO_2$, and from 0 to 40 percent by weight of one or more alkali metal oxides (preferably $Na_2O$ and/or $K_2O$).

The principal specifications, such as the glass composition (expressed in mole percents and, when differing at the centre and surface, so indicated), glass structure diameter, refractive indexes at the centre and surface, and the value of "$a$" in the previously set forth Equation (2) in the vicinity of the centre of examples of the glass structure according to the invention are set forth in Table 3.

Table 3.

| Glass structure: Part: | | 1 Centre | 1 Surface | 2 Centre | 2 Surface | 3 Centre | 3 Surface |
|---|---|---|---|---|---|---|---|
| Composition (mol %) | $Tl_2O$ | 3.3 | 0.9 | 5 | 1 | — | — |
| | $K_2O$ | 13.6 | 17.7 | 20 | 28 | — | — |
| | $Na_2O$ | 3.4 | 1.7 | | | — | — |
| | $Li_2O$ | — | | 5 | 1 | — | — |
| | ZnO | — | | — | | 0 | 9 |
| | PaO | — | | — | | 10 | 8 |
| | PbO | | | | | 35 | 28 |
| | $SiO_2$ | | | | | | 55 |

Table 3.-continued

| Glass structure: Part: | 1 Centre | 1 Surface | 2 Centre | 2 Surface | 3 Centre | 3 Surface |
|---|---|---|---|---|---|---|
| $B_2O_3$ | — | | 70 | | — | |
| $As_2O_3$ | 0.1 | | — | | — | |
| Diameter, mm. | 0.3 | | 0.5 | | 0.3 | |
| Refractive index | | | | | | |
| – – centre: | 1.60 | | 1.58 | | 1.81 | |
| surface: | 1.57 | | 1.55 | | 1.77 | |
| a near | | | | | | |
| centre cm$^{-2}$ | 62 | | 30 | | 30 | |

In the light-conducting glass structure of the invention, the path of advance of light introduced thereinto is bent without the occurence of reflection within the glass structure of the light flux. That is, an incident light introduced into the glass structure advances therethrough as it curves toward the side of higher refractive index. Therefore, it is possible to bend the direction of advance of light through the use of the light-conducting glass structure of the invention.

Furthermore, a light-conducting glass structure having a refractive index distribution which is symmetrical about the central axis of the glass in the light transmission direction and is of a character such that the refractive index decreases or increases approximately proportionally to the square of the distance from the axis as the distance increases, particularly such a glass structure which has been cut to a specific length, can be caused to operate as a convex or concave lens such as to cause converging or diverging of a light flux.

In a light-conducting glass fibre of the invention, since an incident light flux introduced thereinto advances therewithin and therealong without being reflected, differences or discrepancies in the phases of the rays in the light flux exiting from the fibre do not occur, and, moreover, spreading of the light flux width is prevented. Therefore, by utilizing a light-conducting glass fibre according to the invention in photocommunication, it becomes possible to transmit with high efficiency light signals which vary at high speeds.

By providing a light-conducting glass fibre in one part of a light transmission path in photocommunication, and by utilizing the flexible and bendable property possessed by the fibre, it is possible to adjust as desired the position in space and projection direction of light projected out of the fibre exit end.

Particularly when an incident light flux of constant width is introduced by a so-called mode-matching or mode-conformity method into a glass structure having a refractive index distribution representable by Equation (2) set forth hereinbefore, the light flux can be conducted through the structure to be projected from the structure and exit therefrom with the same constant width and without differences in phase velocities even when the structure is bent with a radius of curvature greater than a certain limiting value of radius of curvature. The light flux can also follow a curve within certain limits without an accompanying diffraction loss.

These features of performance can be readily understood through analogy from the theory of gas lenses described in the aforementioned references. Therefore, glass structures having such a refractive index distribution are highly effective for use as transmission lines for laser communication.

Furthermore, in glass structures of plate shape or tubular shape, it is possible to establish a refractive index distribution such that the internal refractive index decreases in approximate proportion to the square of the distance from approximately the central plane. When incident light is introduced along the central plane of this glass structure, the light advances as it meanders through an undulating path on both sides of the central plane. Such a glass structure can be used as a light-conducting glass structure in applications such as lenticular lenses.

It has always been necessary for a light-conducting glass fibre of known clad type to have a glass cladding layer for reflection. In contrast, a cladding layer for reflection is not always necessary for the light-conducting glass fibre of the present invention. Accordingly, the effective area for light-conduction is relatively large, and the manufacture of the fibre is facilitated.

The light-conducting glass fibre of the invention can, in accordance with necessity, also be clad over its surface with a substance which has a refractive index different from that of the glass fibre, such as a light-absorbing substance, or a light-reflecting substance. It is also possible to assemble a plurality of these glass fibres as a fibre bundle or as a densely packed bundle structure. Furthermore, the light-conducting glass fibre of the invention can be applied to communication by laser and other kinds of light, to various kinds of image transmission, and to other light-transmission apparatuses and systems.

It will be readily evident that the articles referred to herein as "light-conducting structures" can have shapes and dimensions within very broad ranges. The term "fibre" is herein used to designate structures having small cross sections in comparison with their lengths irrespective of the shapes of their cross sections. The cross section of such a fibre can be circular, polygonal, or some other shape.

A light-conducting glass structure of the above described character in accordance with the invention can be produced by a method which includes a process of ion substitution by thermal diffusion to cause a variation with position of the concentrations of at least two kinds of cations constituting modifying oxides within the glass.

Accordingly, the method according to the invention for producing a light-conducting glass structure having a refractive index distribution and light-path bending property as described above comprises, in general, a greater substitution of the cation constituting a modifying oxide of the glass at parts closer to the glass surface with another cation capable of constituting a modifying oxide. This ion substitution can be accomplished by causing the glass containing the above mentioned cation to contact the source of the other cation as the process temperature is maintained at a value such that the above mentioned two kinds of ions can migrate within the glass. This substitution produces the variation of refractive index within the glass.

The above mentioned source of the other cation can be of various kinds and forms. For example, it can be a bath of a salt such as a nitrate or sulphate, an oxide, or an elementary simple substance containing this cation. This "bath" can be in the state of a solid, liquid, or a vapour. Another example of the cation course is a glass containing this ion in a form such as an oxide, for example.

The above mentioned temperature at which the contact with the ion source is carried out is, ordinarily, higher than 100°C and, moreover lower than the flow point of the glass. When this temperature is below 100°C, the migratory speeds of the ions are low, whereby the practicality of the process is low. On the other hand, when this temperature is higher than the glass flow point, it is difficult to avoid undesirable deformation of the glass.

More specifically, this contacting temperature is preferably higher than the glass strain point and, moreover, lower than the glass softening point. Most preferably, this temperature is slightly higher than the glass deformation temperature. For example, this process temperature is most preferably in the range of from 450° to 500°C for a glass containing 16 percent of $Tl_2O$, 24 percent of PbO, 12 percent of $Na_2O$, and 48 percent of $SiO_2$ (all percentages by weight) since the strain point of this glass is approximately 350°C, and the softening point thereof is approximately 565°C.

Accordingly, in one specific example of method for producing a light-conducting glass structure of the invention, the glass structure is placed in contact with a salt, and the glass and salt are heated and maintained at a temperature at which the salt and the cation in the glass can diffuse within the glass. As the cation within the salt diffuses into the interior of the glass through the contact surfaces of the salt and glass, a portion of the cation hitherto present in the glass diffuses and moves out of the glass. As a result, the cation in the glass near the contact surface is substituted by the cation previously contained in the salt.

The concentration within the glass of the cation which has diffused from the salt into the glass interior is higher at points nearer the contact surface and decreases with the distance from the contact surface. Inversely, the concentration within the glass of the cation previously existing within the glass is lower at points nearer the contact surface and increases with the distance from the contact surface.

When ratio of the electronic polarizability of the cation contained in the salt and (ion radius)$^3$ (more precisely, the degree of contribution to increase in the refractive index) is lower than that of the cation previously contained within the glass, the refractive index of the glass after ion substitution is lower at parts nearer the contact surface and assumes a distribution wherein the index increases progressively with distance from the contact surface to approach the original glass refractive index. Inversely, when the above mentioned ratio or degree of contribution of the cation contained in the salt is higher than that of the cation contained in the glass, the refractive index of the glass after ion substitution is higher at parts nearer the contact surface and assumes a distribution wherein the index decreases progressively with distance from the contact surface to approach the original glass refractive index.

By selecting a salt and a glass to produce the former distribution and causing the salt to contact the surface of the glass in the form of a fibre with a solid interior thereby to cause ion substitution, a light-conducting glass fibre of the invention in which the refractive index increases progressively inward from the surface toward the interior can be produced. By selecting a salt and a glass for the latter case, causing the salt to contact the inner wall surface of the glass in the form of a fibre with a hollow interior to cause ion substitution, and then causing the inner wall surface to contract and collapse by heating and deforming the glass, a light-conducting glass fibre of the invention having a shape with a solid interior can be produced.

The refractive index within a glass fibre of the invention is determined principally by the following conditions. In a glass of fibre form which has been subjected to the ion-substitution process, the refractive index is determined by conditions such as the composition, dimensions, and shape of the fibrous glass, the composition of the salt, and the temperature and time duration of the ion diffusion process. Since the quantity of diffusion of the ions within the glass is determined by the distance from the contact surface of the glass with the salt, particularly in the case wherein a glass structure of circular or a concentrically circular cross section is used as the glass of fibrous form, the refractive index of the glass interior after ion substitution assumes a symmetrical distribution wherein the index is determined by the distance from the control part in the cross section of the fibre, whereby a desirable result is obtained.

Furthermore, by carefully selecting the process conditions, it is possible to cause the refractive index to approach an ideal distribution representable by a quadratic equation. In addition, it is possible, by subjecting the processed glass in fibrous form to a deformation fabrication process, as necessary, by a treatment such as heating and stretching or surface treatment, to render the glass into a light-conducting glass fibre having desired dimensions and refractive index distribution.

We have found, for example, that by subjecting a glass rod of a diameter of from 0.5 to 2 mm. to ion substitution process and then to a heating and stretching process, a light-conducting glass fibre of a cross-sectional distribution of refractive index which is uniform in the longitudinal direction, of long length, and of a diameter of from 10 to 200 microns can be easily produced.

For the salt to be used as an ion source, any of the specifically enumerated salts containing a cation can be used. It is preferable to use a salt containing the cation existing within the glass and a cation constituting any of the combinations 1) through 5), inclusive, enumerated hereinbefore.

A salt suitable for use in accordance with the invention is a salt containing one or more kinds of these ions. Furthermore, it is also possible to use a mixture of this salt and a salt containing a kind of ion other than that of the above mentioned ion. It is necessary that this salt have a suitable melting point since the cation within the salt must diffuse into the glass interior at the temperature of the salt-to-glass contacting process. Ordinarily, salts such as nitrates and sulphates containing the above mentioned cation are suitable.

In some cases wherein, of the above mentioned cations, $Au^+$ ions, $Ag^+$ ions, or $Cu^+$ ions are caused to be contained within the glass or salt, the ionic valency of these ions vary during the process, undesirable colouration occurring in some instances. Accordingly, in order to prevent this variation, it is necessary in such cases to maintain conditions such as the glass composition and environmental atmosphere in a manner such that an oxidation or reduction reaction does not readily occur.

$Tl^+$ ions have a relatively higher degree of contribution to increase in refractive index than ions of alkali metals such as rubidium and potassium. Moreover, the radius of the $Tl^+$ ion or its ion volume does not differ greatly from the ion radius or ion volume of metals such as rubidium and potassium. For this reason, when a glass containing thallium and a source containing an alkali metal ion such as potassium or rubidium are placed in contact with each other at a high temperature, a light-conducting glass structure having a large refractive index gradient wherein the index increases progressively inward from the surface and having relatively low residual stress is produced.

Since a potassium source is more readily available than a rubidium source, a glass containing thallium is ordinarily caused to contact a potassium source. While sodium ion is considerably smaller in ion radius than a potassium ion, the aforementioned contributions of these two metals are substantially equal. Then, when a glass containing $Tl^+$ and $Na^+$ is placed in contact with a potassium source, the $Tl^+$ and $Na^+$ are respectively substituted by $K^+$, but the substitution of $Na^+$ and $K^+$ in this case imparts almost no effect with respect to the refractive index distribution. On the other hand, this substitution has the effect of tending to nullify the development of tensile stress due to ion substitution of $Tl^+$ and $K^+$ and thereby tends to produce highly desirable results.

While residual stress develops within a glass in which ion substitution is being effected, this residual stress, when of large magnitude, tends to give rise to deleterious occurrences such as cracks in the glass. Accordingly, it is desirable that this residual stress be held below a certain value. The value of this residual stress can be lowered by expedients such as maintaining the ion diffusion temperature at a high value thereby to relieve and lessen stain, subjecting the glass structure to a heat treatment after ion substitution, and appropriately selecting the compositions of the glass and the salt.

When the process temperature is set at a value higher than the annealing point, the possibility of deformation of the glass being processed increases, but the stresses within the glass due to difference in the volumes of the ions undergoing substitution can be relieved and removed through lengthening the time of treatment sufficiently. We have found, furthermore, that differences in coefficients of thermal expansion of glass compositions which vary with position due to ion substitution (which differences also tend to produce residual stress) are of magnitudes which are not deleterious in the practice of this invention.

The development of this residual stress can be prevented by the following specific example of embodiment of the invention.

A glass structure containing a first cation (e.g., thallium ion) is caused to contact an ion source containing a small quantity of the first cation and a second cation (e.g., an alkali metal ion) of a ratio of electronic polarizability to (ion radius)$^3$ (more correctly, degree of contribution to increase in refractive index) which differs from that of the first cation thereby to cause contact between the first cation within the glass and the second cation within the ion source in regions near the contact surfaces and thereby to cause the refractive index to vary progressively inward from the glass surface.

In a process as described above, since a small quantity of the first cation in addition to the second cation is contained in the salt or some other ion source placed in contact with the glass containing the first cation, the presence of the first ion within the ion source has the effect of obstructing the diffusion and migration of the first ion previously in the glass into the ion source. Then the substitution of the first and second ions within the glass near the surface thereof decreases relative to that occurring when the first ion is not contained in the ion source. As a result, the magnitude of the internal stress is lowered. Therefore, even when the contacting process temperature is held at a high value, there is no risk of development of fine cracks.

By thus maintaining the contacting temperature at a high value, the diffusing speeds of the first and second ions within the glass are increased, whereby it is possible to produce with a short contacting time a light-conducting glass structure of a desired refractive index distribution.

Even an extremely small quantity of the first ion contained in the ion source is highly effective, ordinarily being of the order of from 0.1 percent to a number of percent by weight.

Figure 7:
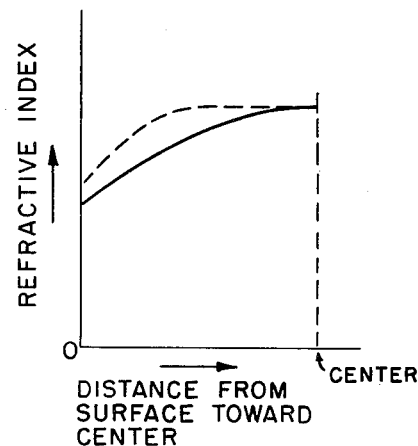
FIGS. 7 and 8 are graphical representations indicating the refractive index distribution within a specific example of a glass structure of the invention.

In an actual instance of practice, for example, two pieces of glass rods of approximately 0.5 mm. diameter having a glass composition in weight percents of $Tl_2O$ : 5, $PbO$ : 20, $Na_2O$ : 15, and $SiO_2$ : 60 were immersed in a molten bath of $KNO_3$ at 450°C for 24 and 72 hours respectively. Thereafter, the internal refractive index distributions of the two glass rods were measured, whereupon values as indicated by the intermittent line and continuous line in FIG. 7 were obtained.

A glass rod of the same composition and dimensions as set forth above was immersed in the same bath at 480°C, whereupon fine cracks developed in the surface of the glass rod. In addition, a glass rod of the same composition and dimensions as set forth above was immersed for 24 hours in molten salt mixture of 99.5 percent by weight of $KNO_3$ and 0.5 percent by weight of $TiNO_3$ at 480°C, whereupon the glass rod was found to have an internal refractive index distribution coinciding with that indicated by the continuous curve in FIG. 7 without any fine cracks on its surface. Thus, by using a salt mixture of $TiNO_3$ and $KNO_3$, a glass rod having a refractive index distribution wherein the index decreases approximately in proportion to the square of the distance from the centre can be produced by a steeping process of relative short time duration.

By the procedure of the above describe example, furthermore, the introduction of a large quantity of the first ion, particularly an ion constituting a modifying oxide, into the glass structure becomes possible, whereby it has become possible to improve greatly the quality of the glass.

That is, more specifically, in order to produce a glass without bubbles and striae, it is preferable to cause the glass to contain a quantity of modifying oxides sufficient for carrying out the work of uniformising the quality of the glass, but an increase in the modifying oxide quantity tends to promote development of fine cracks in the glass, wherefore this increase has hitherto been limited. By the elimination as described above of the risk of this fibre formation, it has become possible to adjust the quantity of modifying oxides in the glass to a quantity amply large for producing a glass of excellent quality.

The refractive index gradient of the glass structure, particularly the preferable internal refractive index distribution in the case of a light-conducting glass structure of rod shape or fibre shape can be represented by Equation (2), in which the value of the constant "a" is an important factor determining the optical characteristics of the glass structure. By this specific example, a glass structure having a desired value of "a" can be obtained merely by appropriately selecting the quantity of the aforementioned first ion admixed within the ion source to be placed in contact with the glass. The effect of adjustment of the quantity of this first ion contained in the ion source on the refractive index distribution is indicated by the following example.

Glass rod samples of approximately 0.6 mm. diameter having a composition by weight of 20 percent of $Tl_2O$. 10 percent of PbO, 14 percent of $NaO_2$, and 56 percent of $SiO_2$ were respectively immersed for 22 hours in four kinds of single-salt and salt-mixture baths, as follows: (1) 100 percent of $KNO_3$ : (2) 99.5 percent of $KNO_3$ aand 0.5 percent of $TiNO_3$; $NO_3$; (3) 99.3 percent of $KNO_3$ and 0.7 percent of $TiNO_3$; and (4) 99.1 percent of $KNO_3$ and 0.9 percent of $TiNO_3$ (said percent referring to weight percent). The resulting refractive index distributions within the glass rod samples were as indicated in FIG. 8, in which curves 81, 82, 83 and 84 correspond to the results of samples immersed in salt baths (1), (2), (3), and (4), respectively.

Figure 8:
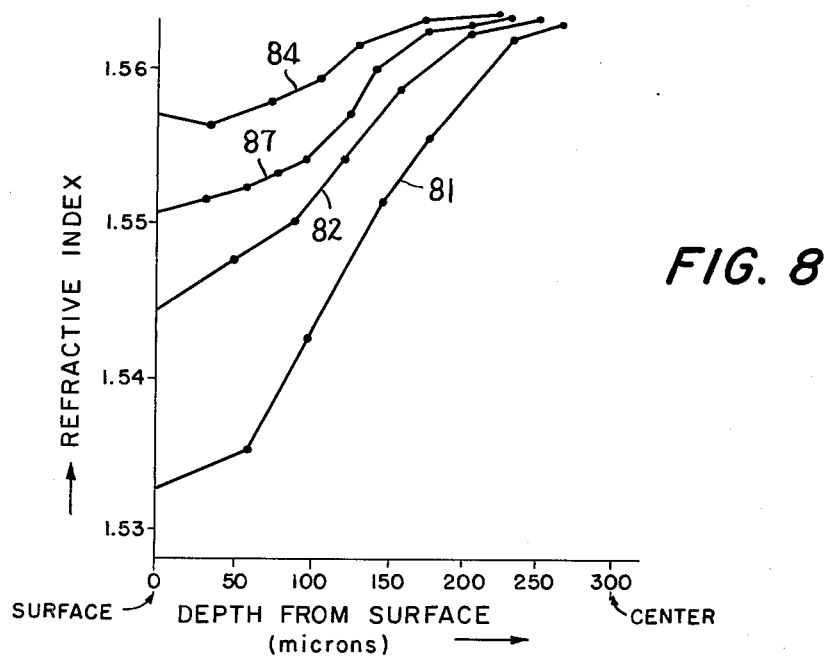

FIG. 8 indicates that the admixture of only minute quantities of $TiNO_3$ causes a great change in the resulting refractive index distribution. When, of these distributions, those of the parts near the central parts of the glass rods are approximated by Equation (2), the values of a in the vicinity of the centres corresponding to salts (1) through (4) are 57, 37, 26, and 11 cm.$^{-2}$, respectively. The value of No in this case is 1.563 and is commonly equal.

In this case the curve of the distribution resulting from the process with salt (2) is the closest to a quadratic curve. The ion concentration distributions of $Tl^+$, $K^+$, and $Na^+$ within the glass after processing with salt baths (2) and (4) are respectively indicated in FIGS. 9 and 10, in each of which the concentration distributions of $Tl^+$, $K^+$, and $Na^+$ are indicated by a continuous line, an intermittent line, and a dot-and-dash line, respectively: The concentration taken as the ordinate in each of FIGS. 9 and 10 is to an arbitrary scale.

Figure 9:
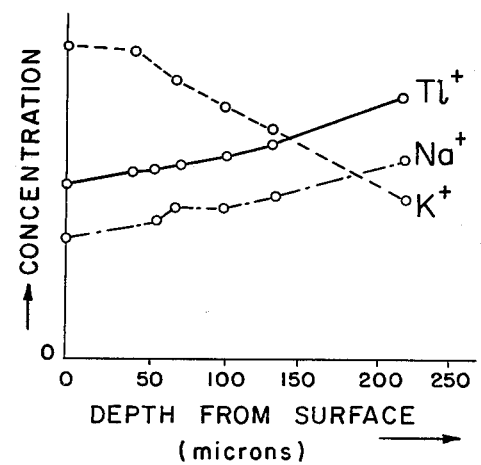
FIGS. 9 and 10 are graphical representations respectively indicating distributions of ion concentrations within the glass structure indicated in FIG. 8.
Figure 10:
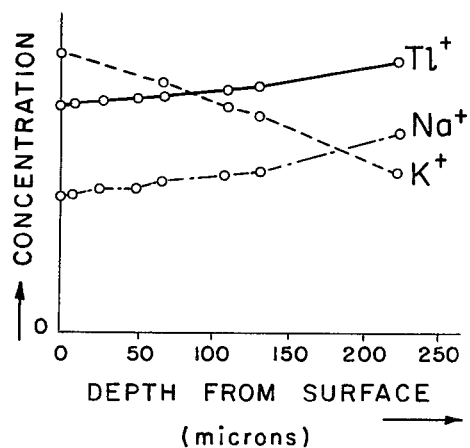

From FIGS. 9 and 10, it can be observed that an increase in the concentration of $TiNO_3$ among the salts from 0.5 percent to 0.9 percent results in a lowering of the rate of the proportion of decrease in the ion concentration of $Tl^+$ from the glass interior outward toward the surface.

Except for the feature of admixing into the ion source to be placed in contact with the glass the same ion as the ion within the glass to be substituted, this specific example does not differ essentially from the first described specific example. Each of the first and second ions is not necessarily limited to a single kind but may contain a plurality of kinds of ions. Furthermore, the glass to be processed may contain, in addition to the first ion, other ions to be substituted by ions within the salt. In the case of this example, also, it is preferable that the glass structure contain $Tl^+$ and, moreover, that the ion source contain alkali metal ions.

In the case wherein a glass fibre containing ions of high degree of contribution to increase in the refractive index as, for example, thallium ions, is placed in contact with a source of ions on low degree of contribution as, for example, alkali metal ions, thereby to cause substitution of the ions, the concentration distribution of each kind of ion is derivable as a solution of the diffusion equation, and, as a result of the process during the time until the ions of the source reach at least the centre of the fibre by diffusion, a refractive index distribution conforming to an ideal quadratic curve is produced near at least the centre of the fibre structure.

However, in spite of the establishment of a refractive index distribution of this nature near the centre, the refractive index of the fibre interior nearer the surface tends to deviate easily and more greatly from the above described distribution. Since this surface layer accompanied by this deviation impairs the light-conducting characteristics of the fibre structure, it is preferable to remove this layer. Ordinarily, the excellent light-conducting characteristics can be preserved by removing a surface layer of a thickness which is approximately 20 percent of the radius of the fibre structure.

While this surface layer removal is carried out along the periphery of the fibre as viewed in cross section, it is not necessarily carried out over the entire length of the fibre in the longitudinal direction thereof, the necessary length of removal being at least $\pi\sqrt{2\,a}$. While this surface layer removal is most preferably accomplished by etching the fibre with an aqueous solution of hydrofluoric acid, the fibre surface alternatively may be removed by grinding.

Another example of the aforementioned "source of another cation" is a glass containing this ion. This ion source is caused to contact a base glass structure to be subjected to ion exchange by covering the base glass structure with this ion source glass, causing the two glasses to fuse together, and maintaining the resulting fused structure at a temperature at which the two kinds of ions can migrate.

In one specific example of this case, the base glass structure is thin and long and has at least one circular boundary as viewed in its cross section, and the region inside of this boundary contains $Tl^+$ ions, while the region outside thereof contains at least one kind of ion from among $Li^+$, $Na^+$, $K^+$, $Rb^+$, and $Cs^+$ ions. This glass structure is held at an elevated temperature to cause ion exchange through the above mentioned boundary. As a result, the glass inside of the boundary is caused to have a refractive index distribution wherein the index decreases progressively from the centre outward toward the periphery.

The manner in which a refractive index distribution as described above can be realized within a glass structure will now be described.

When two kinds of glasses with different compositions are fused together with a smooth boundary interface therebetween and are maintained at a high temperature for a long time, an exchange of ions due to concentration diffusion occurs through the interface. As a result, a smooth ion concentration distribution is produced in the direction perpendicular to the interface. The temperature at which the two glasses are thus treated is preferably of an order such that there is no severe deformation due to softening of the glasses, being ordinarily below the softening temperature of the glasses.

The kinds of ions which undergo such ion exchange with particular facility, however, are limited to monovalent metal ions as is apparent from a comparison of the degree of ion transmission of the glasses. Specific examples of such ions are $Li^+$, $Na^+$, $K^+$, $Rb^+$, $Cs^+$, and $Tl^+$. We have found that in the case wherein, of the two kinds of glasses fused together, a first glass contains $Tl^+$, while the second glass contains at least one kind of ion from among $Li^+$, $Na^+$, $K^+$, $Rb^+$, and $Cs^+$, a refractive index gradient which is sample for light conduction can be obtained.

The ion concentration distribution established in the direction perpendicular to a smooth boundary interface by ion exchange through the boundary interface assumes the character of a smooth curve, but since a diffusion phenomenon is utilized therefor, this distribution may be understood as being in accordance with a solution of the so-called diffusion equation.

Then, a combination of the first glass disposed inside of a circle (as viewed in cross section) and the second glass disposed outside of the circle, which first glass contains an ion of large value of the aforementioned ratio of electronic polarizability to (ion radius)$^3$ (more correctly, degree of contribution to increase in the refractive index), i.e. T/t and which second glass contains an amply small kind of ion, e.g., $Na^+$, of the same ratio may be considered. When such a glass combination is maintained for a long time at a high temperature at which the deformation of the glasses is not severe, the $Tl^+$ ions escape outward into the region outside of the circle, and the $Na^+$ ions migrate into the region inside of the circle.

As a result, the $Tl^+$ and $Na^+$ ions in the region of the first glass assume concentration distributions wherein the $Tl^+$ ions are most dense at the centre and become progressively less dense with distance from the centre, while the $Na^+$ ions are least dense at the centre and become progressively dense with distance from the centre.

In an actual instance of preparation of a glass rod comprising a first glass composed of 30.7 percent of $SiO_2$, 52.6 percent of PbO, and 16.7 percent of $Tl_2O$ and a second glass composed of 37.2 percent of $SiO_2$, 50.0 percent of PbO, and 12.8 percent of $Na_2O$ (all percentages being by weight), of heat treating this glass rod at a high temperature, and of measurement of the concentration distributions of the $Tl^+$ and $Na^+$ ions over the cross section by means of an electron microprobe X-ray analyzer, results as indicated in FIG. 11 were obtained.

Figure 11A:
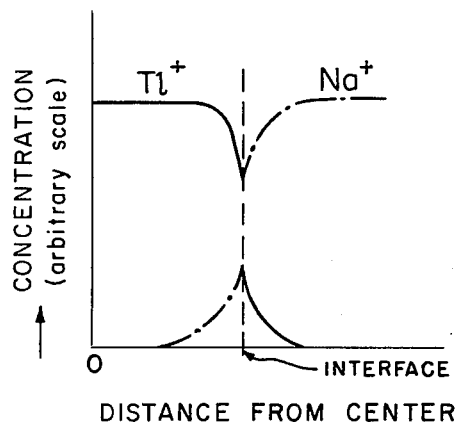
FIGS. 11(a) and 11(b) are graphical representations indicating the concentration distributions of ions constituting a glass structure in radial directions from the centre in cross sections of the structure.
Figure 11B:
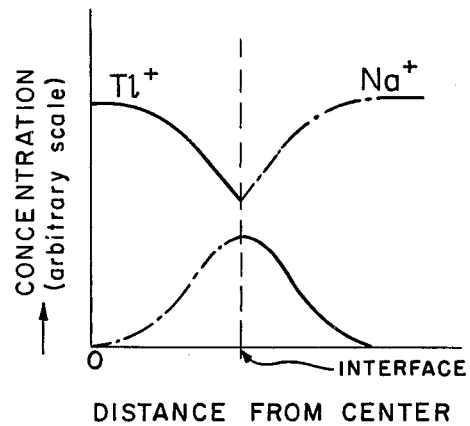

In FIG. 11(a), the intermittent line indicates the boundary interface between the two glasses, and the distributions of the concentrations of Tl ions which were contained in the first glass on the left side of this interface and of Na ions which were contained in the second glass on the right side after the glasses had been treated at 430°C for 8 hours are respectively indicated by continuous lines and dot-and-dash lines. The corresponding concentration distributions in the case wherein, at the same temperature, the treatment time was increased to 48 hours are indicated in FIG. 11(b). As indicated by these graphical representations, the distributions of the $Tl^+$ and $Na^+$ ions within the first glass progressively become smooth.

Figure 12A:
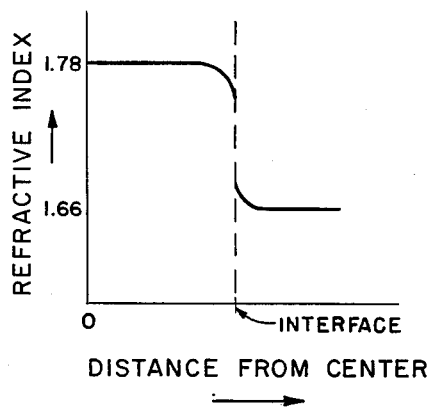
FIGS. 12(a) and 12(b) are, graphical representations respectively indicating refractive index distributions in the same directions.
Figure 12B:
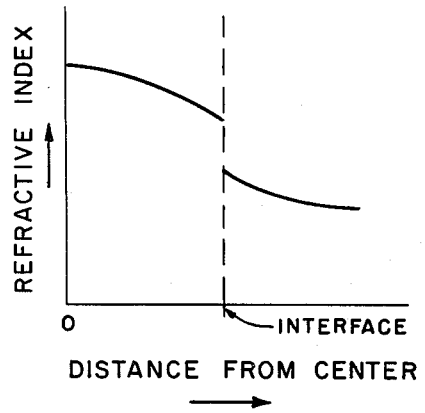

The resulting refractive index distributions of the glass subjected to the above described heat treatments are indicated in FIGS. 12(a) and 12(b), which correspond respectively to FIGS. 11(a) and 11(a). As indicated in these FIGS., when heat treatment is carried out thoroughly, a thin glass structure having in the neighbourhood of its centre axis a region wherein the refractive index decreases with a form approaching a quadratic distribution from the centre axis toward the periphery can be produced. This region, as stated hereinbefore, is capable of conducting with high fidelity a light beam containing a large quantity of information signals. That is, it is possible to provide a glass having the capability of transmitting pictures and images.

A glass structure of the above described character according to the invention can be produced by the use of apparatuses of the following description.

Figure 13:
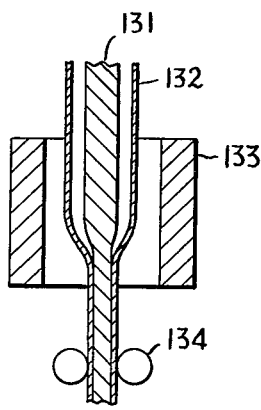
FIG. 13 is a schematic elevation, in vertical section, indicating a mode of production of a glass structure depending on the rod method and constituting a specific example of practice of the invention.

To produce a glass structure having a boundary interface and a first glass within the hollow cylindrical interior of a second glass, a glass structure 131 of rod shape and of a first glass composition is encompassed by a tubular glass structure 132 of a second glass composition, and the two glass structures 131 and 132 are fused intimately together by means of a heating device such as a furnace 133 as indicated in FIG. 13, the glass structure thus fused together being stretched by rolls 134 thereby to produce the desired glass structure.

Figure 14:
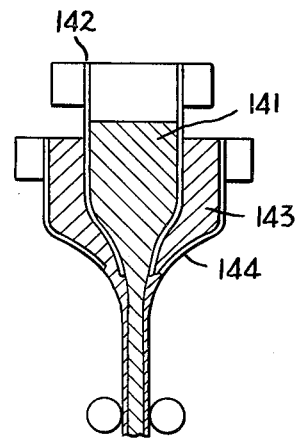
FIG. 14 is a similar schematic elevation indicating a mode of production of a glass structure of the invention depending on the pot method.

Another technique in producing the double glass structure comprises placing the glass 141 of the first composition in the inner pot 142 of double concentric pots made of platinum and having funnel-like shapes with constricted concentric nozzle openings at their bottoms as shown in FIG. 14, placing the glass 143 of the second composition in the outer pot 144, resistance heating the platinum pots to melt the two glasses, and drawing the glasses downward through the nozzle openings.

Figure 15:
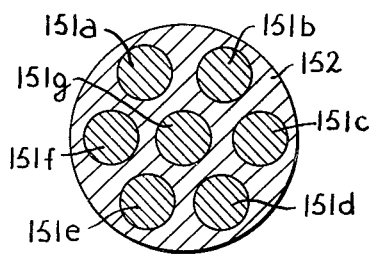
FIG. 15 is cross section of a multiplex light-conducting structure according to the invention containing two or more light-conducting members.
Figure 16:
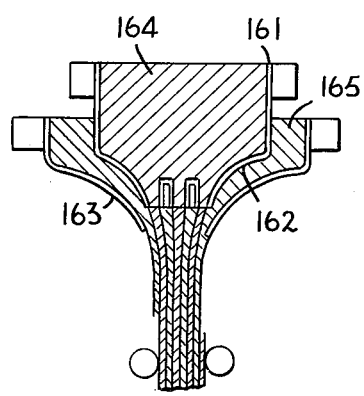
FIGS. 16 and 17 are schematic elevations, in vertical section, indicating modes of producing the glass structure illustrated in FIG. 15.

In another embodiment of the invention as shown in FIG. 15, a glass structure is formed with two or more independent bodies of a first glass 151a through 151g disposed within a second glass 152. A glass structure of this character can be produced, for example, by a method as indicated in FIG. 16. Double concentric pots consisting of an inner pot 161 and an outer pot 163 made of platinum and having a funnel-like shape with constricted nozzle openings at their bottoms are used. The inner pot 161 has two or more nozzle tips 162 at its bottom, while the outer pot 163 has a single annular nozzle tip. A first glass 164 is placed in the inner pot 161, and a second glass 165 is placed in the outer pot 163. The platinum pots are then resistance heated to melt the glasses, which are drawn downward through the nozzles similarly as in the example illustrated in FIG. 14.

Figure 17:
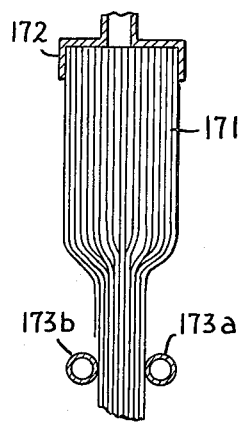

Furthermore, a plurality of glass structures each fabricated by the method indicated in FIG. 13 or FIG. 14 and having a single core can be fused together and drawn by holding one end of a bundle of the glass structures 171 by means of a chuck 172 and pulling the remainder of the bundle by means of rolls 173a and 173b as indicated in FIG. 17. As a result, a glass structure having a cross section wherein rod-like bodies of the first glass are disposed within a plurality of respective rings is obtained.

In a glass structure produced by any of the above described methods and having glasses mutually fused at a fusion interface, a very slight degree of ion exchange is obtained through the fusion interface, but this is not sufficient for producing the desired refractive index gradient, and a heat treatment is ordinarily necessary.

Preferably, the glass structure is maintained for a long time at a temperature below the softening temperatures of the glasses.

The glass structure of rod shape thus obtained can be rendered into a glass of fibrous form by heating the glass structure after ample heat treatment thereof to a temperature above the glass softening point and stretching the structure thus heated.

It is important that the two kinds of glass to be used as described above be so selected that their coefficients of thermal expansion are sufficiently close to each other. However, since the glass structure is in the form of a thin rod or a fibre, it is possible to suppress the occurrence of double refraction even when the two coefficients are not strictly coincident. Furthermore, since the heat treatment time is long, it is necessary to select glasses of ample small devitrification tendency.

Very fine glass fibres produced in the above described manner can be assembled to form an optical fibre bundle. We have found that the quantity of light transmitted through such a fibre bundle is much greater than that transmitted through conventional optical fibres of clad type. The reason for this high performance is that loss due to total reflection does not arise in the optical fibre of the invention.

Techniques such as using a tinted glass for the second glass thereby to prevent infiltration of light from the outside and effecting light insulation mutually between the members of the first glass are effective for maintaining contrast of images and signals.

When, in a composite glass structure comprising a core glass structure and a covering glass which, as an ion source, has caused a desired variation in the refractive index within the core glass, the refractive index variation created also in the covering glass is considered, and the refractive index variation across the interface between the two glasses is a smooth variation, this composite glass in entirety becomes a light-conducting structure according to the invention.

More specifically, in one specific example of embodiment of the invention, there is provided a method for producing a light-conducting glass structure in which the refractive index is caused to vary progressively in the transverse direction relative to the light advance direction thereby to cause the light advance path within the structure is caused to band, the method comprising the steps of combining in laminar disposition glass members of at least two different refractive indexes and holding the glass members thus combined at a temperature at which diffusion through the interface therebetween of ions constituting modifying oxides within the glasses on both sides of the interface occur.

In a glass structure to be thus produced, oxides including ions which have not undergone diffusion, within the two glasses are so selected that in the case wherein they mutually have substantially equal mol concentrations and are formed into independent glasses, these glasses have substantially equal refractive indexes.

In order to indicate still more fully the nature and utility of the invention, the following specific examples of practice constituting preferred embodiments of the invention are set forth, it being understood that these examples are presented as illustrative only and that they are not intended to limit the scope of the invention. Throughout these examples, all percentages of quantity are by weight unless otherwise specified.

EXAMPLE 1

A glass fibre having a 0.2 mm. diameter and composed of 20 percent of $Tl_2O$, 12 percent of $Na_2O$, 20 percent of PbO, and 48 percent of $SiO_2$ was steeped for 4 hours in a potassium nitrate bath maintained at 400°C. Thereafter, the glass fibre was removed from the bath, cooled, rinsed with water, and dried.

Figure 3:
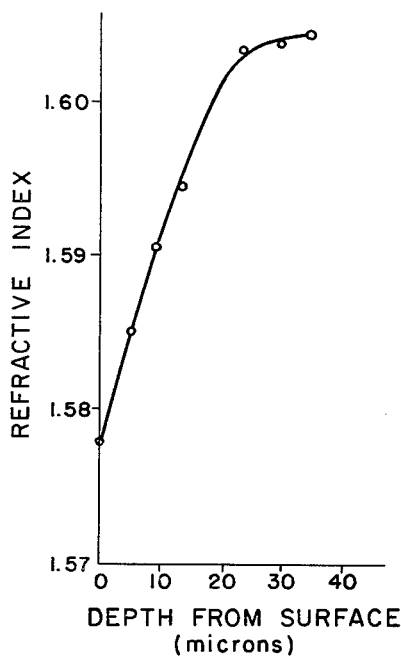

The refractive index of the surface of the glass fibre thus treated was found to be 1.578, which was 0.026 lower than that before the glass fibre was treated. The refractive index distribution of this glass fibre after treatment is indicated in FIG. 3.

Figure 4:
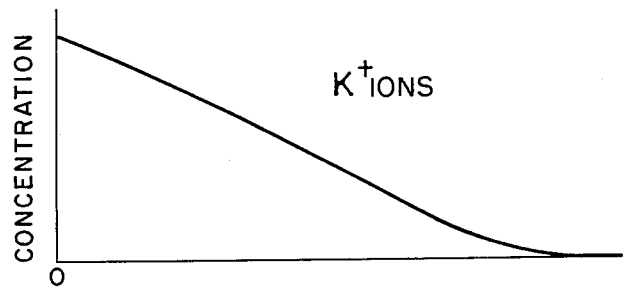
FIGS. 3 through 6, inclusive, are graphical representations indicating the characteristics of a specific example of a light-conducting glass structure according to the invention.
Figure 4:
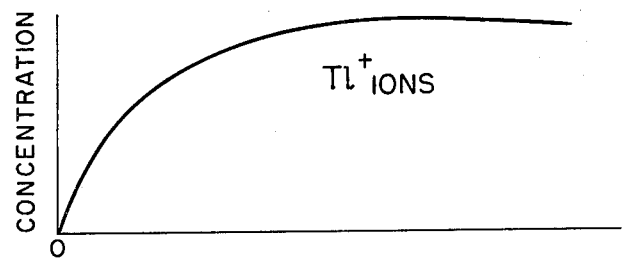
Figure 4:
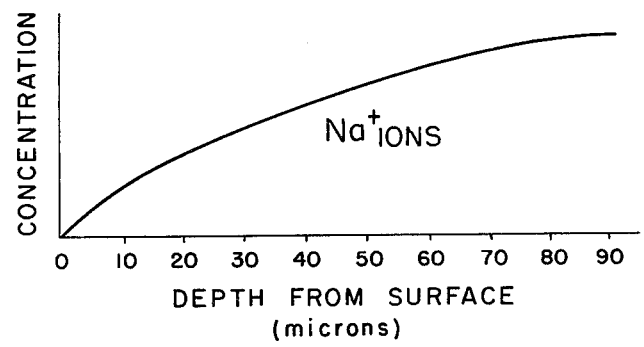

Next, the concentration distributions respectively of thallium ions, sodium ions, and potassium ions with the glass fibre thus treated were measured by an electron microproble X-ray analysis method, whereupon results as indicated in FIG. 4 were obtained. The concentrations shown in FIG. 4 are set forth in accordance with an arbitrary scale.

From these results, it is apparent that the thallium ions, while being of substantially constant concentration in parts deeper than approximately 40 microns from the surface, decrease in concentration from a depth of 40 microns to the surface. The sodium ions assume a substantially constant concentration in parts deeper than approximately 80 microns and decrease in concentration from 80 microns to the surface. In contrast, the concentration of the potassium ions increases toward the glass surface and decreases inward from the surface, becoming zero (nil) at a depth of approximately 80 microns.

These results indicate and verify that the thallim and sodium within the glass were exchanged with the potassium within the bath. Furthermore, it may be considered that the refractive index distribution as shown in FIG. 3 was produced principally by the exchange of thallium and potassium ions.

A piece of approximately 10cm. length of this glass fibre was bent to assume a radius of curvature of 1 cm., and an incident light flux of a width of approximately 0.02 mm. was introduced into the central part of one end of the glass fibre piece, whereupon the light flux advanced through the glass fibre with an undulating path without being reflected at the fibre surface until it reached the other end of the glass fibre. The width of the light flux reaching this other end was found to be substantially equal to that of the incident light flux.

EXAMPLE 2

A glass fibre of the same composition and dimension as that specified in Example 1 was steeped for 19 hours in a potassium nitrate bath maintained at a temperature of 430°C. Thereafter the glass fibre was removed from the bath, cooled, rinsed with water, and dried.

Figure 5:
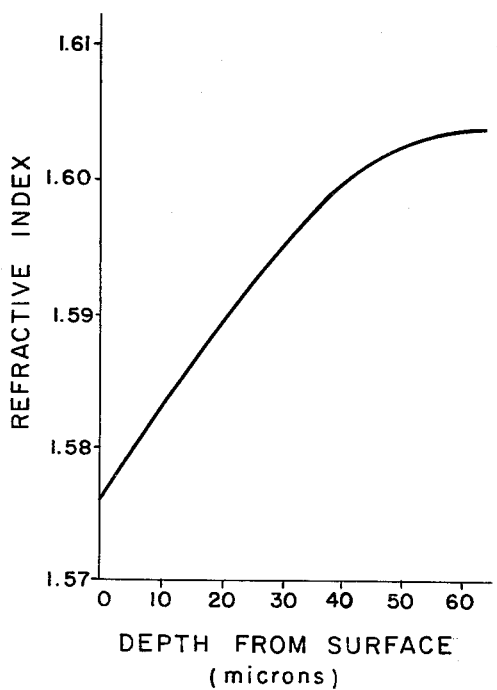

The refractive index distribution of the glass fibre thus treated was measured and found to be as indicated in FIG. 5, which shows the refractive index as increasing progressively up to a depth from the glass surface of approximately 50 microns.

EXAMPLE 3

Samples of glass fibres of 0.2 mm. diameter respectively of 8 different glass compositions were prepared and steeped in a bath of potassium nitrate. Thereafter, each fibre was removed from the bath, cooled, rinsed with water, and dried.

The refractive index of the surface of each fibre sample was measured before and after the above described treatment. The glass compositions prior to the steeping process are indicated in Table 4, and the steeping process temperatures, the steeping process times, the surface refractive indexes before and after the process, and the differences therebetween are indicated in Table 5.

Table 4.

| GLASS SAMPLE No. | GLASS COMPOSITION (% by weight) | | | | | |
|---|---|---|---|---|---|---|
| | $SiO_2$ | $B_2O_3$ | $Al_2O_3$ | PbO | $Na_2O$ | $Tl_2O$ |
| 1 | 68 | — | — | — | 17 | 15 |
| 2 | 60 | — | — | — | 15 | 25 |
| 3 | 64 | — | — | 10 | 16 | 10 |
| 4 | 48 | — | — | 20 | 12 | 20 |
| 5 | 63 | 9 | — | — | 18 | 10 |
| 6 | 56 | 8 | — | — | 16 | 20 |
| 7 | 49 | 7 | — | — | 14 | 30 |
| 8 | 48 | — | 5 | 15 | 12 | 20 |

Table 5.

| GLASS SAMPLE No. | PROCESS TEMP. (°C) | PROCESS TIME (hr.) | SURFACE REFRACTIVE INDEX BEFORE PROCESS (A) | SURFACE REFRACTIVE INDEX AFTER PROCESS (B) | REFRACTIVE INDEX DIFFERENCE (A) − (B) |
|---|---|---|---|---|---|
| 1 | 500 | 14 | 1.531 | 1.513 | 0.018 |
| 2 | 450 | 14 | 1.554 | 1.529 | 0.025 |
| 2 | 500 | 14 | 1.554 | 1.520 | 0.034 |
| 3 | 450 | 14 | 1.545 | 1.535 | 0.010 |
| 4 | 500 | 4 | 1.604 | 1.572 | 0.032 |
| 5 | 400 | 3 | 1.528 | 1.522 | 0.006 |
| 5 | 450 | 3 | 1.528 | 1.517 | 0.011 |
| 6 | 400 | 3 | 1.551 | 1.528 | 0.023 |
| 6 | 450 | 3 | 1.551 | 1.524 | 0.027 |
| 7 | 350 | 3 | 1.573 | 1.558 | 0.015 |
| 7 | 400 | 3 | 1.573 | 1.541 | 0.032 |
| 7 | 450 | 3 | 1.573 | 1.530 | 0.043 |
| 8 | 430 | 4 | 1.578 | 1.548 | 0.030 |
| 8 | 480 | 4 | 1.578 | 1.544 | 0.034 |

From the results indicated in Tables 4 and 5, it is apparent that the refractive index difference increases with increase in the process temperature. It was observed, moreover, that the refractive index of the glass fibre after the treatment at the central part was equal to that of the surface of the fibre before treatment and that the refractive index progressively decreased toward the surface.

EXAMPLE 4

A glass fibre having a diameter of 0.6 mm. and composed of 16 percent of $Tl_2O$, 12 percent of $Na_2O$, 24 percent of PbO, 2 percent of CaO, and 46 percent of $SiO_2$ was steeped for 170 hours in a salt mixture maintained at 500°C and containing 50 mol percent each of $K_2SO_4$ and $ZnSO_4$.

The internal refractive index distribution of the glass fibre thus treated was measured and found to be such that in the vicinity of the fibre centre, that is, within a circle of 0.25 mm. radius from the center as viewed in cross section, the value of the refractive index n was representable in terms of the distance $r$ (cm.) from the centre and $a = 30$ cm$^{-2}$ substantially in accordance with the following equation.

$$n = 1.60 (1 - ar^2)$$

In addition, it was verified that this refractive index distribution was due principally to the substitution of the thallium ions within the glass and the potassium ions within the salt mixture.

EXAMPLE 5

A glass rod composed of 5 percent of $Tl_2O$, 15 percent of $Na_2O$, 20 percent of PbO, and 60 percent of $SiO_2$ and having a diameter of 1 mm. was steeped for 72 hours in a potassium nitrate bath maintained at 430°C. The rod was thereafter removed from the bath, cooled, rinsed with water, and dried. The glass rod thus treated was then heated to approximately 650°C and drawn in the longitudinal direction into a glass fibre of 0.14 mm. diameter.

Figure 6:
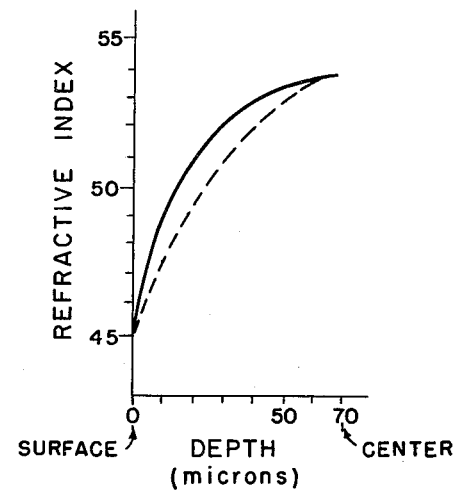

The refractive index of the resulting glass fibre was found to be 1.545 at the surface of the fibre and 1.564 at the central part thereof. The refractive index distribution of this glass fibre is indicated by the continuous line in FIG. 6, which line is close to the quadratic curve (intermittent line) of the ideal case.

EXAMPLE 6

A glass fibre composed of 16 percent of $Tl_2O$, 12 percent of $Na_2O$, 24 percent of PbO, and 48 percent of $SiO_2$ and having a diameter of 0.3 mm. was steeped for 36 hours in a bath of sodium nitrate maintained at 450°C.

The internal refractive index of the glass fibre thus treated was found to exhibit a distribution substantially conforming to the following equation in the vicinity of the fibre centre, that is, within a circle of 0.1 mm. radius from the centre $$n = 1.60 (1 - ar^2),$$

where: $n$ is the refractive index at a distance $r$ from the centre, and $a = 75$ cm$^{-2}$.

EXAMPLE 7

A glass rod composed of 49 percent of $SiO_2$, 7 percent of $B_2O_3$, 14 percent of $Na_2O$, and 30 percent of $K_2O$ was steeped for 72 hours at a temperature of 450°C in a thallium chloride bath.

The glass rod thus treated exhibited a refractive index distribution such that the index $N_0$ at the centre was 1.50, and the index N at a position at a distance $r$ (cm.) from the centre within a circle of approximately 0.3 mm. diameter as viewed in cross section satisfied the following equation.

$$N = N_0 (1 + ar^2),$$

where:

$a = 90$ cm$^{-2}$.

This glass rod was cut to a specific length, and both cut ends thereof were ground to surfaces perpendicular to the longitudinal direction of the glass rod, whereupon it was confirmed that this rod had the functional effect of a concave lens having an optical axic coincident with the centre axis of the rod.

EXAMPLE 8

A glass fibre composed of 62 percent of PbO, 12 percent of BaO, and 26 percent of $SiO_2$ and having a diameter of 0.3mm. was steeped for approximately 200 hours in a $ZnCl_2$ bath maintained at 400°C.

The internal refractive index of the glass fibre thus treated had a distribution such that in the vicinity of the fibre centre, that is, within a circle of a 0.1 mm. radius from the centre as viewed in cross section, the refractive index $n$ at a distance $r$ (cm.) from the centre was substantially in accordance with the following equation.

$$n = 1.81 (1 - ar^2),$$

where:
$a = 30$ cm$^{-2}$.

EXAMPLE 9

A glass fibre composed of 27 percent of $Tl_2O$, 10 percent of $Li_2O$, and 63 percent of $B_2O_3$ and having a diameter of 0.5 mm. was steeped for 48 hours in a potassium nitrate bath maintained at 480°C.

The refractive index of the glass fibre thus treated had a distribution wherein, in the vicinity of the fibre centre, that is, within a circle of a 0.5 mm. radius from the centre as viewed in cross section, the index $n$ at a distance $r$ (cm) from the centre substantially satisfied the following equation.

$$n = 1.58 (1 - ar^2),$$

where:
$a = 30$ cm$^{-2}$.

EXAMPLE 10

A hollow glass rod composed of 10 percent of $K_2O$, 10 percent of $Na_2O$, 15 percent of CaO, and 65 percent of $SiO_2$ and having an outer diameter of 2 mm. and an inner diameter of 0.5 mm., one end of the hollow interior of the rod being closed, was filled with molten thallium nitrate and maintained in this state at 400° for 20 hours. Thereafter, the thallium nitrate was drained out, and the glass rod was rinsed with water.

Next, this glass rod was heated to and maintained at 650°C and, as the hollow interior of the rod in this state was evacuated, was drawn in the longitudinal direction thereof. As a result, the hollow interior of the rod became progressively smaller until it collapsed, and, finally, a glass fibre of 0.2 mm. diameter and solid interior was obtained.

The refractive indexes of this glass fibre at the surface and central part thereof were found to be 1.535 and 1.554, respectively, the refractive index decreasing progressively from the central part toward the surface.

EXAMPLE 11

A glass rod composed of 20 percent of $Li_2O$ and 80 percent of $SiO_2$ and having the same dimensions as the glass rod in Example 10 was subjected to the same treatment as set forth in Example 10, whereupon a glass fibre was obtained.

The refractive indexes at the surface and central part of this glass fibre were found to be 1.549 and 1.555, the refractive index increasing progressively from the surface toward the interior.

EXAMPLE 12

A glass fibre comprising a glass-fibre core composed of 10.2 percent of $Tl_2O$, 17.6 percent of $Na_2O$, 9.0 percent of $B_2O_3$, and 63.2 percent of $SiO_2$ (all in mol percent) and having a 0.2 mm. diameter and a surface covering layer composed of 10.2 percent of $K_2O$, 17.6 percent of $Na_2O$, 9.0 percent of $B_2O_3$, and 63.2 percent of (all in mol percent) and having a thickness of 0.05 mm. was prepared. The refractive index of the glass core was 1.625, while that of the covering layer glass was 1.494. The glass fibre thus prepared was heated to 550° and thus maintained for 15 hours.

The refractive index of the glass fibre thus treated was found to have a distribution wherein it increased progressively from the surface toward the interior.

EXAMPLE 13

A glass fibre comprising a glass-fibre core composed of 4.2 percent of $Tl_2O$, 12.5 percent of $Na_2O$, 33.3 percent of MgO, and 50.0 percent of $P_2O_5$ (all in mol percent) and having a diameter of 0.3 mm. and a surface covering layer having the same composition as the core and having a thickness of 0.15 mm. was prepared. The refractive index of the core was 1.53, while that of the covering layer glass was 1.51. This glass fibre was heated to a temperature of 400°C and thus maintained for 72 hours.

The refractive index within the glass fibre thus treated was found to exhibit a distribution such that, within a circle of 0.2 mm. radius from the fibre centre as viewed in cross sections, the refractive index $n$ at a distance $r$ (cm.) from the centre satisfied the following equation.

$$n = 1.53 (1 - ar^2),$$

where
$a = 60$ cm$^{-2}$.

EXAMPLE 14

A glass rod composed of 56 percent of $SiO_2$, 14 percent of $Na_2O$, 20 percent of $Tl_2O$, and 10 percent of PbO and having a 1 mm. diameter was prepared and steeped for 24 hours at a temperature of 500°C in a $KNO_3$ bath containing 0.2 percent of $TlNO_3$.

The glass rod thus treated was found to have a refractive index N at its centre of 1.56 and at its surface of 1.53 and a refractive index distribution wherein the following equation was satisfied.

$$N = N_o (1 - ar^2),$$

where:
N is the refractive index of the central part and
$a = 7.7$ cm$^{-2}$.

This glass rod was cut to a speciric length, and its two ends were ground perpendicularly to the centre axis thereof, whereupon the glass rod was found to exhibit an excellent lens effect.

EXAMPLE 15

A glass rod composed of 56 percent of $SiO_2$, 14 percent of $Na_2O$, and 30 percent of $Tl_2O$ and having a 1 mm. diameter and 200 mm. length was prepared and steeped for 15 hours at 510°C in a $KNO_3$ bath containing 1.7 percent of $TlNO_3$.

As a result, a glass rod having a refractive index distribution such that, in the cross section of the rod, the index increased progressively from the periphery toward the centre, and a parabolic distribution symmetrical about the centre was indicated was obtained.

This glass and was cut to a specific length, and the two ends thereof were ground perpendicularly to the centre axis, whereupon the glass rod was found to have an excellent lens effect.

EXAMPLE 16

A glass fibre having the same composition as the rod in Example 14 and having a 0.5 mm. diameter and a 500 mm. length was formed and steeped for 22 hours at 475°C in a $KNO_3$ bath containing 0.5 percent of $TlNO_3$.

As a result, the glass fibre was found to have a refractive index of parabolic distribution symmetrical about the centre of the fibre as viewed in cross section, the index increasing progressively from the periphery toward the centre.

The two ends of this glass fibre were ground flat in planes perpendicular to the centreline of the fibre, and a gas laser beam was introduced in a mode-matched state into one end of the fibre, whereupon the beam was conducted with high efficiency along the centre axis of the fibre without any impairment of the laser polarisability.

EXAMPLE 17

A glass core rod composed of 69.5 percent of $SiO_2$, 25.5 percent of CdO, and 5.0 percent (all in mol percent) of $Tl_2O$ and a glass covering tube composed of 74.8 percent of $SiO_2$, 20.2 percent of BaO, and 5.0 percent of $K_2O$ and having an inner diameter somewhat greater than the diameter of the core rod were prepared.

Then, as indicated in FIG. 13, the covering tube 132 and the core rod 131, maintained in concentric relationship, were gradually passed from above through the heating device 133, in which the core rod 131 and covering tube 132 fused together. The rod and tube thus fused together were then passed between rolls 134, whereupon a covered glass rod was obtained.

This rod had a core of 0.10 cm. diameter and a covering layer of 0.20 cm. outer diameter. The refractive index of the core was 1.645, while that of the covering layer was 1.567.

This covered rod was heat treated for 24 hours in an electric furnace at 480°C. The components of the rod glass and the covering layer glass which cannot diffuse at 480°C are $SiO_2$-CdO and $SiO_2$-BaO, respectively, the concentrations of which in this instance were both 95 mol percent. Furthermore, in the case where these components form glasses independently, the resulting glasses (that is, a glass composed of 73.1 mol percent of $SiO_2$ and 26.9 mol percent of CdO and a glass composed of 78.8 mol percent of $SiO_2$ and 21.2 mol percent of BaO) both have a refractive index of 1.565.

Figure 18:
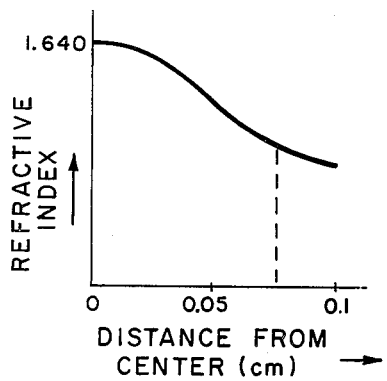
FIG. 18 is a graphical representation indicating the refractive index distribution in a radial direction from the centre in a cross section of a specific example of a glass structure of the invention.

The thallium ions within the core glass and the potassium ions within the covering layer glass diffuse respectively within the covering layer and the core during heat treatment. The refractive index distribution within the covered glass rod after heat treatment in this instance was as indicated in FIG. 18. In the regions in the vicinity of the glass rod centre, the refractive index decreased substantially in proportion to the square of the distance from the centre, but in the peripheral regions, particularly in parts at distances exceeding 0.075 cm. from the centre, the refractive index deviated greatly from the quadratic curve.

Accordingly, the peripheral part of this glass rod was removed by dissolving with hydrofluoric acid to produce a glass rod of 0.15-cm. diameter.

The refractive index distribution within the glass rod thus produced was found to be representable substantially by the following equation.

$$N = N_o (1 - mr^2),$$

where:
$N_o$ is the refractive index at the rod cross sectional centre and was equal to 1.640;
r is the distance from the centre; and
$a$ is a positive constant and was equal to 8.3 $cm^{-2}$.

Furthermore, the refractive index was found to vary in a continuous manner on both sides of the original interface between the core glass and covering layer glass.

A piece of 0.5 cm. length was cut from this glass rod and both cut surfaces were ground perpendicularly to the centre axis, whereupon a convex lens having a focal distance of 0.16 cm. was obtained.

EXAMPLE 18

A covered glass rod obtained by fusion in the heating device in the same manner as set forth in Example 17 was steeped for 48 hours in a sodium nitrate bath maintained at 430°C.

The glass rod thus treated was found to have a refractive index distribution which conformed to a quadratic curve not only in the central part thereof but also throughout the peripheral parts. The reason for this can be considered to be that, in addition to the mutual diffusion of the thallium ions within the core glass and the potassium ions within the covering layer glass, mutual diffusion principally of the potassium ions within the covering layer glass and the sodium ions within the bath occurred, whereby the refractive index in the vicinity of the outer side of the covering layer decreased.

The internal refractive index N of this rod was found to be representable substantially by the following equation.

$$N = N_o (1 - ar^2),$$

where:
$N_o$ is the refractive index at the cross sectional centre of the rod and was equal to 1.640 in this instance;
r is the distance from the centre; and
a is a positive constant and was equal to 4.3 $cm^{-2}$.

A piece of 0.5 cm. length of this glass rod was cut out, and the two cut surfaces were ground perpendicularly to the centre axis, whereupon a convex lens of a focal distance of 0.21 cm. was obtained.

EXAMPLE 19

Figure 19:
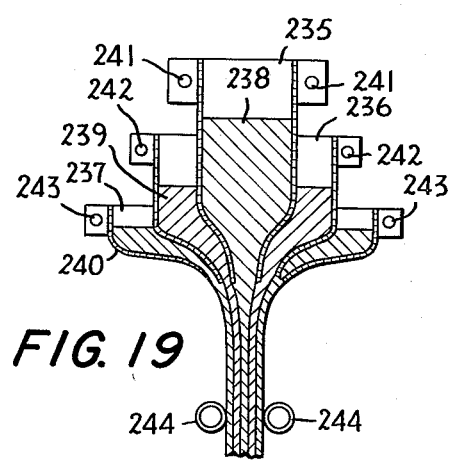
FIG. 19 is a schematic elevation, in vertical section, indicating a specific example of method for producing a glass structure according to the invention.

Core glass cullet composed of 80.3 percent of $SiO_2$, 12.7 percent of PbO, and 7.0 percent of $Tl_2$, an intermediate layer glass cullet composed of 77.7 percent of $SiO_2$, 12.3 percent of PbO, 4.0 percent of $Tl_2O$, and 6.0 percent of $K_2O$, and an outer layer glass cullet composed of 69.3 percent of $SiO_2$, 17.7 percent of BaO, and 13.0 percent of $K_2O$ (all in mol percent) were prepared and fabricated into a triple-lamination glass rod by means of a triple pot, as shown in FIG. 19.

More specifically, the above specified core, intermediate layer, and outer layer glass cullets 238, 239, and 240 in molten state were place respectively in inner pot 235, intermediate pot 236, and outer pot 237 of the triple pot provided respectively with electrodes 241, 242, and 243 for electric heating. The three molten glasses thus placed flowed out through respective nozzles at the bottoms of the pots and, being guided by guide rollers 244, were rendered into a triple-lamination glass rod having a cross section of concentric layers of the three glasses.

The diameter of the core, outer diameter of the intermediate layer, and outer diameter of the outer layer were 0.2 cm., 0.4 cm., and 0.6 cm., respectively, and the refractive indexes of these laminations were 1.658, 1.621, and 1.562, respectively.

This glass rod was maintained for a specific time within an electric furnace at 450°C. The components of the core, intermediate layer, and outer layer which cannot diffuse at 450°C are respectively $SiO_2$-$PbO$, $SiO_2$-$PbO$, and $SiO_2$-$BaO$, the mol percent concentrations of which within the three glasses in this instance were 93, 90, and 87 percent, which values are approximately equal to 90 percent.

Furthermore, glasses formed independently by these components which cannot diffuse at 450°C (that is, a glass composed of 86.3 percent of $SiO_2$ and 13.7 percent of PbO, a glass composed of 86.3 percent of $SiO_2$ and 13.7 percent of PbO, and a glass composed of 79.7 percent of $SiO_2$ and 20.3 percent of BaO (all in mol percent)) all have a refractive index of 1.563.

As a result of the heat treatment within the electric furnace, migrations principally of the thallium ions within the core glass and the potassium ion within the intermediate layer glass respectively to the intermediate layer and core sides occurred through the interface therebetween. At the same time, migrations principally of thallium ions within the intermediate layer glass and potassium ions within the outer layer glass respectively to the outer layer and intermediate layer sides occurred through the interface therebetween.

As a result of these ion migrations, the discontinuities of the concentrations of the thallium and potassium ions existing prior to the heat treatment on both sides of the interfaces were eliminated, and the ion concentrations assumed distributions wherein the thallium ion concentration decreased, while the potassium ion concentration increased progressively from the center of the glass rod toward the periphery. Consequently, the refractive index within the glass rod assumed a distribution in which at decreased in a substantially continuous manner from the centre toward the periphery, and which approximated a quadratic curve particularly in regions near the centre.

By removing the peripheral part of this glass rod by uniformly dissolving with hydrofluoric acid to obtain a glass rod of 0.5 cm. diameter, cutting off a piece of 0.5 cm. length of this glass rod, and grinding both cut surfaces perpendicularly to the centre axis, a convex lens of a focal distance of 0.71 cm. was obtained.

The internal refractive index N of this lens was substantially representable by the following equation.

$$N = N_o (1 - ar^2),$$

where:
$N_o = 1.655$ and
$a = 0.92$ cm$^{-2}$.

EXAMPLE 20

A glass fibre composed of 3.3 percent of $Tl_2O$, 17.0 percent of $Na_2O$, 9.5 percent of PbO, 70.1 percent of $SiO_2$, and 0.1 percent of $As_2O_3$ (all in mol percent) and having a diameter of 0.3 mm. was steeped for 24 hours in a potassium nitrate bath maintained at 460°C.

The glass fibre thus treated was found to have, at its central part, a refractive index of 1.60 and a composition of 3.3 percent of $Tl_2O$, 3.4 percent of $Na_2O$, 13.6 percent of $K_2O$, 9.5 percent of PbO, 70.1 percent of $SiO_2$, and 0.1 percent of $As_2O_3$ (all in mol percent) and, at its surface, a refractive index of 1.57 and a composition of 0.9 percent of $Tl_2O$, 1.7 percent of $Na_2O$, 17.7 percent of $K_2O$, 9.5 percent of PbO, 70.1 percent of $SiO_2$, and 0.1 percent of $As_2O_3$ (all in mol percent).

Figure 20:
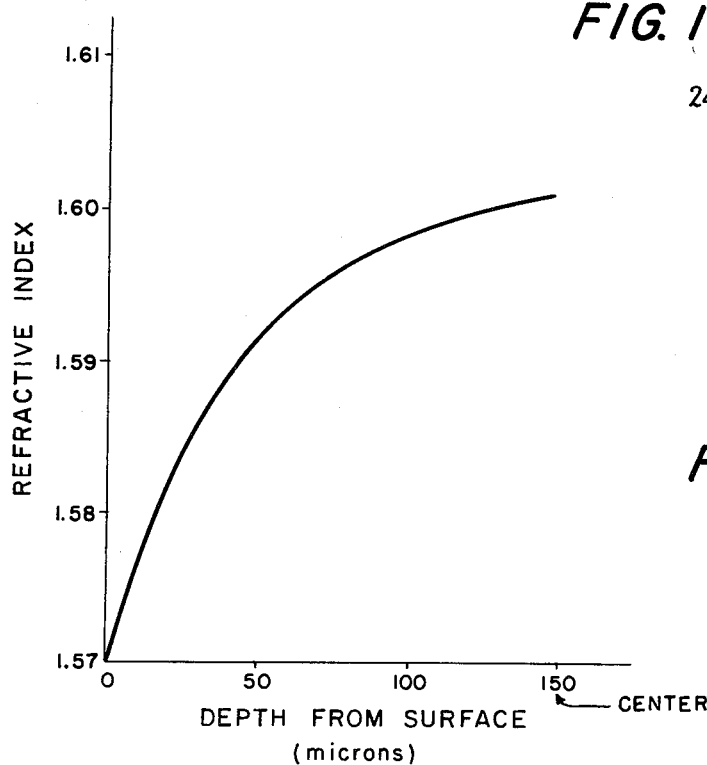
FIG. 20 is a graphical representation indicating the refractive index distribution within a specific example of a glass structure of the invention.

The refractive index within this fibre thus treated had a distribution as indicated in FIG. 20, which conformed approximately to the following equation in the cross sectional region within a circle of 0.1-mm. radius from the centre.

$$n = 1.601 (1 - ar^2),$$

where:
r (mm.) is the distance from the centre;
$n$ is the refractive index at distance r; and
$a = 0.62$ mm$^{-2}$.

We claim:

1. A method for producing a glass fibrous structure for conducting light along the center axis thereof, characterized by having a refractive index distribution within said structure wherein a refractive index decreases continuously in a direction radially and outwardly from said center axis toward the outer surface of said structure, said method comprising: providing a glass fiber having a constant refractive index and a generally circular cross-section and containing therein a glass forming oxide and a first monovalent cation constituting a glass modifying oxide; contacting said glass fiber with a source of second monovalent cation all along the outer surface of the glass fiber at a high temperature and for a specific time to thereby cause migration of said first and second cations in the interior of said glass fiber at said temperature to thereby cause substitution of said second cation for said first cation in the glass of said glass fiber so as to decrease the refractive index of the glass fiber in a radially outward direction from said center axis; and controlling said specific time in such a manner that said second cation in said source migrates into said glass fiber through said outer surface of said glass fiber to thereby cause substitution of said second cation for said first cation so as to form concentration gradients of said first and second cations within the glass fiber, said gradients corresponding respectively to continuous increase and decrease of said first and second cations from said surface toward said center axis of said structure to thereby establish said refractive index distribution by said concentration gradients of said first and second cations.

2. A method for producing a glass fibrous structure as claimed in claim 1, in which said first and second cations are respectively thallium ion and alkali metal ion.

3. A method for producing a glass fibrous structure as claimed in claim 1, in which said specific time is controlled so as to enable said second cation to reach at least said center axis to thereby cause decrease of the refractive index in a radial and outward direction and substantially in proportion to the square of the distance from the center axis at least in the vicinity of the center axis.

4. A method for producing a glass fibrous structure as claimed in claim 1, in which said source of second monovalent cation comprises a glass containing therein said second cation; and wherein said contacting comprises fusing said glass onto the surface of said glass fiber.

5. A method for producing a glass fibrous structure as claimed in claim 1, in which said source of second monovalent cation comprises a salt containing said second cation.

6. A method for producing a glass fibrous structure as claimed in claim 1, in which said temperature is higher than the glass strain point and lower than the glass softening point of said glass fiber.

7. A method for producing a glass fibrous structure as claimed in claim 2, in which said glass fiber consists of a silicate glass containing thallium ion.

8. A method for producing a glass fibrous structure as claimed in claim 1, in which said glass fiber is, after said contacting, heated and drawn in the longitudinal direction thereof to reduce the cross-sectional size of said glass fiber.

9. A method for producing a glass fibrous structure for conducting light along the center axis thereof, characterized by having a refractive index distribution within said structure wherein the refractive index decreases continuously in a direction redially and outwardly from said center axis toward the outer surface of said structure, said method comprising: providing a glass fiber having a constant refractive index and a generally circular cross-section and containing therein a glass forming oxide and a first cation constituting a glass modifying oxide; contacting said glass fiber with a glass containing second cation all along the outer surface of the glass fiber at a high temperature and for a specific time to thereby cause migration of said first and second cations in the interior of said glass fiber at said temperature to thereby cause substitution of said second cation for said first cation contained in the glass of said glass fiber so as to decrease the refractive index of said glass fiber in a radially outward direction from said center axis, said contacting being carried out by fusing said glass onto the surface of said glass fiber; and controlling said specific time in such a manner that said second cation in said source migrates into said glass fiber through said outer surface of the glass fiber to thereby cause substitution of said second cation for said first cation so as to form concentration gradients of said first and second cations within the glass fiber, said gradients corresponding respectively to continuous increase and decrease of said first and second cations from said surface toward said center axis of said structure to thereby establish said refractive index distribution by said concentration gradients of said first and second cations.

10. A method for producing a glass fibrous structure for conducting light along the center axis thereof, characterized by having a refractive index distribution within said structure wherein the refractive index decreases continuously in a direction radially and outwardly from said center axis toward the outer surface of said structure, said method comprising: providing a glass fiber having a constant refractive index and a generally circular cross-section and containing therein a glass forming oxide and a first cation constituting a glass modifying oxide; contacting said glass fiber with a source of a second cation all along the outer surface of the glass fiber at a high temperature and for a specific time to thereby cause migration of said first and second cations in the interior of said glass fiber at said temperature to thereby cause substitution of said second cation for said first cation in the glass of the glass fiber so as to decrease the refractive index of said glass fiber in a radially outward direction from said center axis; and controlling said specific time in such a manner that said second cation in said source migrates into said glass fiber through said outer surface of the glass fiber thus causing substitution of said second cation for said first cation to thereby form concentration gradients of said first and second cations within the glass fiber, said gradients corresponding respectively to continuous increase and decrease of said first and second cations from said surface toward said center axis of the structure to thereby establish said refractive index distribution by said concentration gradients of said first and second cations, said specific time being controlled so as to enable said second cation to reach at least said center axis to thereby cause decrease of the refractive index in a radial and outward direction and substantially in proportion to the square of the distance from the center axis at least in the vicinity of the center axis.

* * * * *

UNITED STATES PATENT OFFICE
CERTIFICATE OF CORRECTION

PATENT NO. : 3,923,486
DATED : December 2, 1975
INVENTOR(S) : Ichiro Kitano, et al It is certified that error appears in the above–identified patent and that said Letters Patent are hereby corrected as shown below:

In the Heading, Item [73] Assignee:

delete "Nihon Itagarasu Kabushiki Kaisha" and insert

--Nippon Selfoc Kabushiki Kaisha--.

Signed and Sealed this first Day of June 1976

[SEAL]

Attest:

RUTH C. MASON
Attesting Officer

C. MARSHALL DANN
Commissioner of Patents and Trademarks